Jan. 2, 1968 D. B. LISS ETAL 3,361,431
SPRING DRIVE FOR ROTARY MECHANICAL SEAL
Filed July 15, 1965
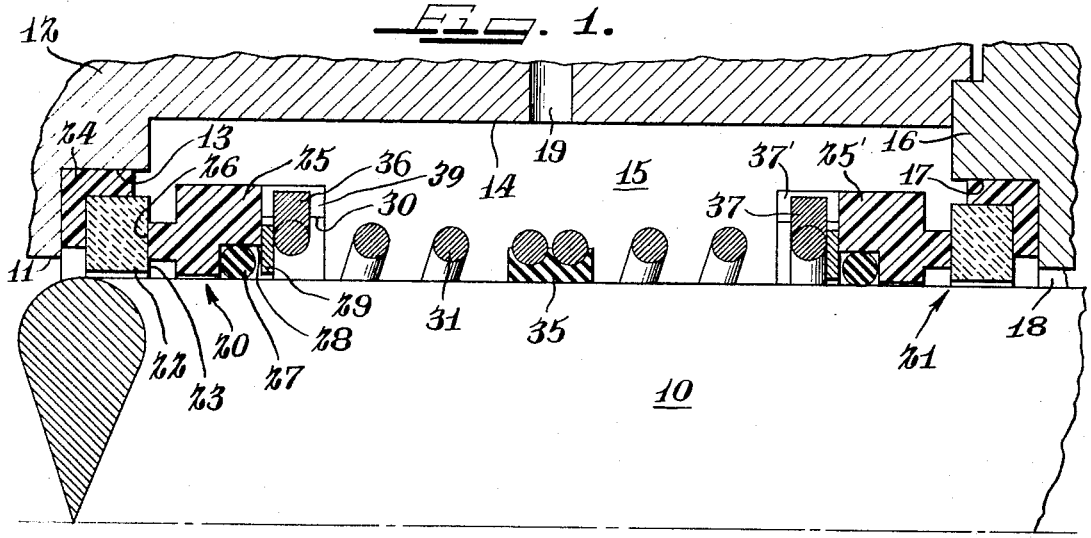
Fig. 1.
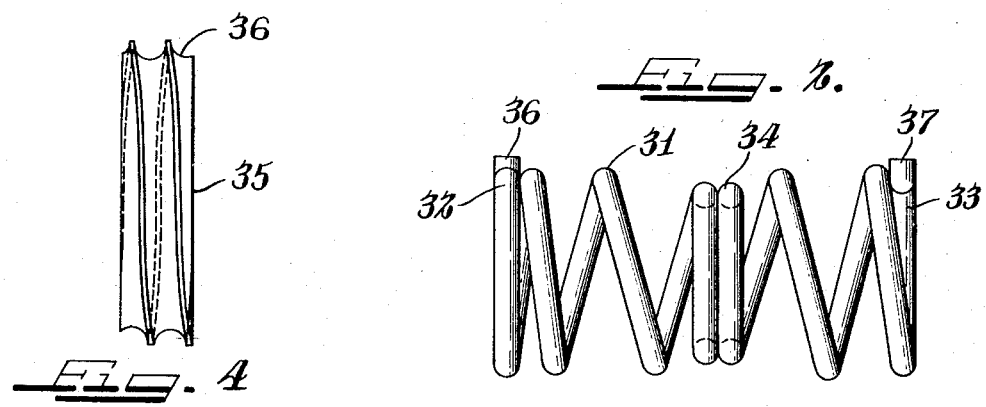
Fig. 2.
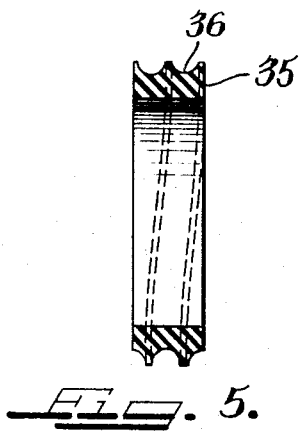
Fig. 4.
Fig. 5.
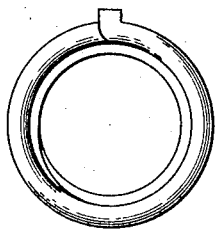
Fig. 3.
INVENTORS
DANIEL B. LISS
JAMES H. THAYER
BY Charles F. Voytech
Atty.

United States Patent Office 3,361,431
Patented Jan. 2, 1968

3,361,431
SPRING DRIVE FOR ROTARY MECHANICAL SEAL
Daniel Bernard Liss and James H. Thayer, Chicago, Ill., assignors to Crane Packing Company, Morton Grove, Ill., a corporation of Illinois
Filed July 15, 1965, Ser. No. 472,139
3 Claims. (Cl. 277—62)

ABSTRACT OF THE DISCLOSURE

A driving means for the spring-driven washers of a double rotary mechanical seal wherein the washers have secondary sealing means between themselves and the shaft encircled thereby, the driving means comprising a separate centrally located elastomeric ring compressed against the shaft by the central portion of the spring to fix the ring to the shaft and thereby drive the spring.

Background of invention

This invention relates to rotary mechanical seals and particularly to a drive means for the sealing washer thereof.

A rotary mechanical seal for sealing off an annular space between relatively rotating elements is generally comprised of a pair of sealing washers having mating lapped running radial faces, resilient means effecting a seal between each of the washers and its respective relatively rotating element, and resilient means for holding one of the washers against the other so that a fluid-tight seal is effected between the said lapped mating faces. The washer held by the resilient means has a sealing element which is flexible to enable the washer to move axially toward the other sealing washer. There is, however, a certain amount of torque developed between the lapped faces, particularly at the instant when relative rotation commences and if the sealing element is flexible enough to move forward under the action of the resilient means, it is too soft to overcome the starting torque between the washers.

It has been proposed to connect the movable washer to its relatively rotatable element by axially movable interlocking machine elements, but such elements add to the cost of the sealing device as a whole.

It is an object of this invention to utilize the resilient means for urging an axially movable sealing washer against its mating sealing surface to effect a drive between the said washer and its relatively rotatable element.

It has further been proposed to provide a lubricant chamber for a rotary mechanical seal, said chamber being defined by the rotary mechanical seal itself at one end and by a substantial duplicate of said rotary mechanical seal at the opposite end. In such double seal arrangements it has also been proposed, in the interest of economy, to use a single spring in compression between oppositely facing sealing washers of the two rotary mechanical seals, to provide the necessary axial takeup force for the washers. It has further been proposed to provide a spring with a central section adapted to grip a shaft or the like to provide a driving torque in the spring which can be transmitted directly to the washer. Such shaft-driven spring, however, has not proved satisfactory because of the expansible nature of the spring which causes the spring to lose its grip upon the shaft.

It is accordingly a further object of this invention to provide a means for preloading a central section of a spring to a shaft to provide a drive for the spring which may then be transmitted to the individual sealing washers of two oppositely facing rotary mechanical seals.

As a more detailed object, this intervention has within its purview the provision of an elastomeric ring which is compressed between a spring and a shaft, or the like, said spring being helical and said elastomeric ring having a correspondingly pitched helical groove to receive the central section of the spring, thereby to improve the driving effect for the spring obtained from said elastomeric ring.

A still further object of this invention is the provision of a spring for a double seal wherein said spring is of helical form, with the central turns thereof closed and preloaded upon an elastomeric ring having a similarly contoured external groove to receive the closed central section of the spring, said elastomeric ring encircling and gripping a shaft, or the like.

These and other objects of this invention will become apparent from the following detailed description when taken together with the accompanying drawings in which FIG. 1 is a quarter-sectional view of a double seal embodying this invention;

FIGS. 2 and 3 are respectively side and end elevational views on a reduced scale of the spring for the double seal of FIG. 1;

FIG. 4 is an elevational view on a scale intermediate that of FIGS. 1 and 2 of the novel elastomeric drive ring for the spring and FIG. 5 is an axial cross-section through the elastomeric ring of FIG. 4.

In the form chosen to illustrate this invention, the preferred embodiment is shown installed as a double seal, but it is understood that the invention is equally adaptable to a single seal embodiment.

In FIG. 1 there is shown a shaft 10 which passes through an opening 11 in a housing 12, said opening 11 having a first counterbore 13 of relatively short axial dimension and a long counterbore 14 forming with shaft 10 an annular chamber 15. Said chamber is closed at its right hand end as viewed in FIG. 1 by a cover plate 16 which is suitably secured and sealed with respect to housing 12 by known means (not shown). Cover plate 16 has a counterbore 17 which, for convenience, may be identical in dimension to counterbore 13. Cover plate 16 has an opening 18 therein through which said shaft 10 extends.

It is contemplated that chamber 15 will be filled with a lubricant which may be introduced thereinto through an opening 19 in housing 12, and a similar opening (not shown) may be provided as an outlet for the lubricant, thereby establishing a continuous flow through chamber 15. Said lubricant may also be passed through a heat exchanger (not shown) by which said lubricant is cooled to maintain the contents of the chamber 15 at a temperature favorable to the seals in said chamber.

Openings 11 and 18 are sealed with respect to shaft 10 by a pair of substantially identical oppositely facing rotary mechanical seals designated generally at 20 and 21. Seal 20 is comprised of a seat washer 22 of hard material such as ceramic, which is provided with a radially disposed lapped face 23 and which for purposes of illustration is shown as having a substantially rectangular radial cross-section. Seat washer 22 is pressed into a cup 24 of elastomeric material retained in first counterbore 13 and compressed therein by seat washer 22. Cup 24 provides a fluid-tight seal between seat washer 22 and housing 12 and at the same time provides a flexible resilient mounting for washer 22 to allow said washer to adjust itself to slight misalignment of seal parts cooperating therewith. Said seat washer 22 is held against rotation relative to housing 12 by the press fit between itself and the elastomeric cup 24.

Seal 20 is further comprised of a sealing washer 25 also of hard material but preferably one which does not gall or chatter when rubbed against the material of seat washer 22 in the presence of the fluid which is contained in chamber 15. Said seal washer has a radially disposed lapped sealing face 26 which is adapted to bear against radial face 23 on seat washer 22 with a rubbing fluid-tight fit. Washer 25 is sealed with respect to shaft 10 by an elastomeric O ring 27 received in a recess 28 in said washer with a slight radial interference fit to provide a fluid-tight seal between the washer 25 and shaft 10. Said O ring 27 is prevented from leaving the recess 28 by a metal washer 29 extending across said recess and bearing against the bottom of a counterbore 30 in washer 25.

Metal washer 29 is held against the bottom of recess 30 by a spring 31 which, for purposes of illustration, has been shown as a single spring serving both rotary mechanical seals 20 and 21. It is understood, however, that individual springs formed in a manner hereinafter to be described, may be used for each seal 20 and 21, if desired. As illustrated in FIGS. 1, 2 and 3, spring 31 is preferably comprised of a single length of wire formed into a helix having closed ends 32 and 33. The central section 34 of the spring is likewise closed for approximately two turns and in addition is of a slightly smaller diameter than the ends 32 and 33, so that the diameter of the spring varies from its ends to the central portion 34. The internal diameter of the central section 34, however, is greater than the diameter of shaft 10, so as to leave an annular space therebetween for the reception of an elastomeric ring 35. Said ring 35, as shown more clearly in FIGS. 4 and 5, has an external helical groove 36 formed therein of a depth and width to receive the central section 34 of spring 31. The diameter of the ring 35 across the bottom of the groove 36 is greater than the internal or smallest diameter of the central section 34 of spring 31, so that when said spring is assembled over shaft 10 with ring 35 therebetween, said ring 35 is compressed by the spring against shaft 10 and provides a friction grip for the spring from shaft 10 by which torque from said shaft is transmitted to the central section 34 of spring 31. This torque is then transmitted through the spring to the ends 32 and 33 and said ends in turn are mechanically interlocked with their respective washers by forming a radially extending end 36, for example, on end 35 which is received in a slot 39 in washer 35. Thus the torque in spring 31 is transmitted to washer 25, and the O ring 27 is therefore relieved of the driving torque which it would otherwise have to develop to cause washer 25 to rotate relative to seat 26.

It may be apparent from the description thus far given that the formation of a groove 36 in ring 35 provides a greater area of contact between said ring 35 and the central section 34 of spring 31, thereby increasing the friction grip between the ring and spring and the certainty of a drive between shaft 10 and spring 31.

End 33 of spring 31 has a similar radially extending end portion 37 received in a corresponding slot 37' in washer 25' of seal 21. Ring 35 therefore serves to drive both washer 25 and 25' from shaft 10 through spring 31.

Where a single seal arrangement is to be used, it is understood that one or the other of the seals 20 and 21 would be omitted and that that portion of spring 31 extending from ring 35 to the omitted seal would similarly be omitted. The function of ring 31 in a single seal arrangement is otherwise identical to that in the double seal arrangement.

The helical form of groove 36 ensures maximum area of contact between the central section 34 of the spring and elastomeric ring 35, thereby assuring the greatest amount of drive between the ring 35 and spring. The pressure between ring 35 and shaft 10 ultimately causes ring 35 to seize upon shaft 10 and ensures a drive between ring 35 and spring 31.

For double seals of the type illustrated herein, with a counterclockwise rotation of the drive end of the shaft 10, the spring must be left-hand wound to cause a contraction of the spring ring 35. For shafts turning clockwise as viewed from the drive end of the shaft a right-hand wind should be used for the spring. In a single seal construction and a counterclockwise rotation of the shaft, a left-hand coiling should be used for the spring.

It is understood that the foregoing description is merely illustrative of a preferred embodiment of this invention and that the scope of this invention therefore is not to be limited thereto, but is to be determined by the appended claims.

We claim:

1. In combination, a shaft, axially spaced sealing washers for rotary mechanical seals encircling the shaft, individual secondary sealing means between each washer and the shaft, a helical spring encircling the shaft between said washers and adapted to exert axial pressure in opposite directions upon the sealing washers, rotary driving connections between the ends of the spring and said washers, and an elastomeric ring encircling the shaft between an intermediate section of said spring and said shaft, said elastomeric ring being compressed against said shaft by said intermediate section of said spring and transmitting a drive from the shaft to said washers through said spring.

2. The combination described in claim 1, said intermediate section of said spring having substantially closed turns, and said elastomeric ring being compressed against said shaft by said closed turns.

3. The combination described in claim 1, said intermediate section of said spring having substantially closed turns, and said elastomeric ring having a helical peripheral groove formed therein to receive the substantially closed turns of the spring.

References Cited

UNITED STATES PATENTS

| 1,931,733 | 10/1933 | Leibing | 277—41 X |
| 2,277,196 | 3/1942 | Arf | 277—93 X |

FOREIGN PATENTS

| 1,163,099 | 2/1964 | Germany. |

SAMUEL ROTHBERG, *Primary Examiner.*